United States Patent
Shoshan et al.

(10) Patent No.: US 12,300,020 B1
(45) Date of Patent: May 13, 2025

(54) SYSTEM TO ASSESS BIOMETRIC INPUT DATA

(71) Applicant: AMAZON TECHNOLOGIES, INC., Seattle, WA (US)

(72) Inventors: Alon Shoshan, Haifa (IL); Nadav Israel Bhonker, Talmei Elazar (IL); Igor Kviatkovsky, Haifa (IL); Manoj Aggarwal, Seattle, WA (US); Gerard Guy Medioni, Los Angeles, CA (US); Lior Zamir, Ramat Hasharon (IL); Ori Linial, Haifa (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 395 days.

(21) Appl. No.: 17/809,237

(22) Filed: Jun. 27, 2022

(51) Int. Cl.
*G06V 40/12* (2022.01)
*G06F 21/32* (2013.01)
*G06V 40/10* (2022.01)

(52) U.S. Cl.
CPC .......... *G06V 40/1347* (2022.01); *G06F 21/32* (2013.01); *G06V 40/117* (2022.01)

(58) Field of Classification Search
CPC .... G06V 40/1347; G06V 40/117; G06F 21/32
USPC ....................................................... 382/103
See application file for complete search history.

(56) References Cited

U.S. PATENT DOCUMENTS

| | | | | |
|---|---|---|---|---|
| 2020/0014540 A1* | 1/2020 | Kaga | ................... | G06V 40/1365 |
| 2020/0388050 A1* | 12/2020 | Tu | ............... | G06T 7/80 |

FOREIGN PATENT DOCUMENTS

| | | | | |
|---|---|---|---|---|
| CN | 102043944 | * | 12/2014 | ......... G06V 40/1394 |
| CN | 109496143 | * | 6/2020 | ............. A61B 34/20 |
| CN | 113362292 | * | 9/2021 | ........... G06T 7/0012 |
| JP | 2021090488 | * | 6/2021 | |
| KR | 102250548 | * | 5/2021 | ........... G06Q 20/409 |
| WO | WO2021163603 | * | 8/2021 | ............... A61B 1/04 |

OTHER PUBLICATIONS

Wang, et al., "Unified Representation Learning for Cross Model Compatibility", Computer Vision and Pattern Recognition, Computer Science, Cornell University, Aug. 11, 2020, 13 pgs. Retrieved from the Internet: URL: https://arxiv.org/abs/2008.04821.

* cited by examiner

*Primary Examiner* — Jerome Grant, II
(74) *Attorney, Agent, or Firm* — Lindauer Law, PLLC

(57) ABSTRACT

A user performs an enrollment process to utilize a biometric identification system. This includes acquisition of biometric input data. Accuracy of subsequent identification is improved by utilizing high quality input data during enrollment. Input data is processed using a plurality of embedding models to determine a plurality of embedding vectors. These embedding vectors are translated into a common embedding space. Input quality may be determined based on analysis of these embedding vectors. For example, if a mean distance of the translated embedding vectors is less than a threshold value, the input data may be deemed to be of sufficient quality for use to complete an enrollment process. This analysis may also be used for post-enrollment operation, such as during an identification process to determine query input data that is of insufficient quality.

20 Claims, 5 Drawing Sheets

SYSTEM TO ASSESS BIOMETRIC INPUT DATA

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
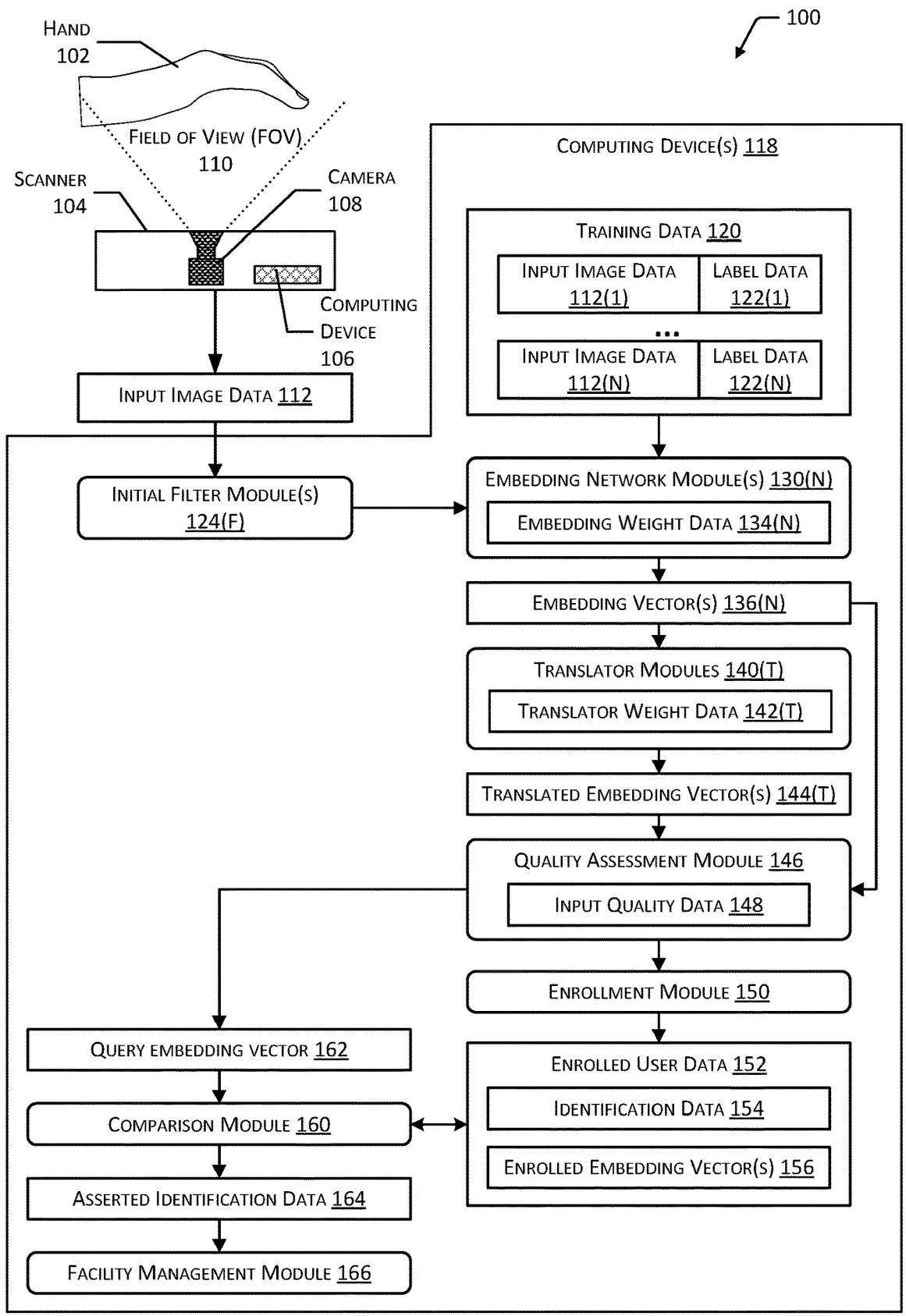
FIG. 1 illustrates a system to assess quality of biometric input data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A biometric identification system offers substantial advantages in many situations. For example, the ability to accurately identify a user at a point of sale allows for quick and convenient payment processing without the need for the user to present a credit card, smart phone, or other physical token. In another example, accurate biometric identification improves physical access by unlocking a door to allow a particular person to enter a controlled area.

A biometric identification system utilizes biometric input data during operation. This input data is used to enroll users, during subsequent queries to identify users, and so forth. Low quality input data results in poor performance of the system, while high quality input data results in performance that meets or exceeds design specifications.

The quality of the input data may be deemed to be one or more aspects of the input data that affect the accuracy of the output. For example, "low quality" input data acquired during enrollment may result in an inability for a user to be identified during queries made after enrollment. In another example, "low quality" input data acquired during queries may result in an inability for the user to subsequently be identified, even if "high quality" input data was obtained during enrollment.

Assessing the quality of input data has traditionally involved the use of filtering algorithms. For example, if the input data is an image, filter algorithms may be used to assess if the image is blurry, underexposed, overexposed, and so forth. Other filters may involve more complex assessments of the input data itself. For example, features in the input data may be detected and counted, intermediate layers of convolutional neural networks that have processed input data may be analyzed, and so forth. However, such techniques may involve substantial testing, assessment, and manual adjustment to achieve desired results. This is time consuming and expensive. If part of the system changes, re-adjustment of these filters may result. For example, the filters may need to be re-tuned after modifying the hardware that acquires the input data, changing an embedding model used, and so forth.

Described in this disclosure are systems and techniques for assessing biometric input data to determine input quality data representative of the quality of that input data. The biometric input system may utilize embedding networks that have been trained to generate embedding vectors. Accurate operation of the system utilizes a comparison of an enrolled embedding vector based on input data obtained during enrollment with a query embedding vector resulting from later query input data. The quality of the image may then be deemed those aspects in the input data that affect identification. Given that identification is based on embedding vectors, quality may in one sense be considered to be those aspects that affect embedding vectors.

Quality of input data may be assessed by processing the input data using a plurality of embedding networks to determine a plurality of embedding vectors. Each of these embedding vectors is representative of the input data within their respective embedding spaces. Each embedding network is associated with a translator module. Each of these translator modules is used to translate a respective one of the embedding vectors into a translated embedding vector. The translated embedding vectors are in a common embedding space.

The translated embedding vectors are then assessed to determine input quality data representative of the quality of the input data. In one implementation, a mean distance between of translated embedding vectors may be calculated. If the mean distance is less than a threshold distance, the input data may be deemed to have sufficient quality for further processing. If the mean distance is greater than the threshold distance, the input data may be deemed to have insufficient quality. Other actions, such as discarding the input data, acquiring additional input data, and so forth may be taken.

By using the techniques described in this disclosure, a biometric identification system is able to accurately assess biometric input data. Biometric input data with sufficient quality is subsequently used while input with insufficient quality is not, improving overall system performance. For example, by using the data with sufficient quality the accuracy of identification during operation is substantially improved.

Illustrative System

FIG. 1 illustrates a system 100 to manage biometric data, according to some implementations. The system 100 is described as being used to improve security and facilitate the management of data used as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In some implementations, images may be acquired using different combinations of polarized or unpolarized light provided by the infrared lights.

The images produced by the scanner 104 may be of first modality features, second modality features, or both. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of unpolarized light or polarized light provided by infrared lights. In one implementation, the input image data 112 comprises first modality image data and second modality image data. The first modality image data and the second modality image data of the same object may be acquired in rapid succession with respect to one another. For example, the camera 108 may operate at 60 frames per second and acquire the first modality image data in a first frame and the second modality image data in a second frame. In another implementation, the input image data 112 may comprise a single multi-modal image that includes at least some features present in both the first modality and the second modality. For example, the hand 102 may be illuminated with unpolarized or randomly polarized infrared light, and the camera 108 may include an infrared optical bandpass filter in the optical path. The resulting input image data 112 may include surface and subcutaneous features.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Training data 120 may comprise input image data 112, such as input image data 112 acquired using one or more modalities. For example, the training data 120 may comprise first modality image data, second modality image data, multi-modal image data, and so forth. The input image data 112 in the training data 120 may be associated with label data 122. For example, the label data 122 may be indicative of modality, identity, and so forth.

The training data 120 may comprise one or more of actual input data with associated label data 122 or synthetic input data with associated label data 122. The actual input data may comprise actual input image data 112 that has been acquired from individuals who have opted in to provide training data 120. In one implementation, the training data 120 may exclude individuals who have enrolled to use of the system for identification. In another implementation, some enrolled users may opt in to explicitly permit input image data 112 obtained during enrollment to be stored as actual input data for later training.

An embedding network module 130 includes an embedding network model that is trained using the training data 120 to determine an embedding vector 136. The embedding network model may comprise a neural network or other machine learning system that, during training, determines embedding weight data 134. The embedding weight data 134 may comprise weight values, bias values, or other values associated with operation of nodes within the machine learning system of the embedding network model. Due to the variability involved in the training process, even using the same training data 120 and same architecture of embedding network model, different trained embedding network modules 130 will have different embedding weight data 134, and thus produce different embedding vectors 136 as output given the same input image data 112.

The embedding vector 136 is representative of at least some of the features represented in the input, such as the input image data 112. The embedding vector 136 comprises a vector value in an embedding space. The embedding space is particular to the embedding network module 130 used to generate the embedding vector 136.

In some implementations, the system 100 may use one or more initial filter module(s) 124(F) to assess input data such as the input image data 112 before further processing. By determining and removing poor quality input image data 112, performance of the system 100 is improved, as described below.

The initial filter module(s) 124(F) may use one or more techniques to assess input image data 112. For example, filter algorithms may be used to determine if the input image data 112 is blurry, underexposed, overexposed, and so forth. Other filters may involve more complex assessments. For example, features in the input data may be detected, counted, and compared to a threshold. In another example, intermediate layers of convolutional neural networks that have processed input data may be analyzed. During operation, the initial filter modules 124(F) may process the input image data 112. If the input image data 112 is deemed to be of sufficient quality based on one or more parameters of the initial filter modules 124(F), the input image data 112 may be provided to another portion of the system 100, such as the embedding network modules 130(N) for additional processing. However, low quality images may still pass the initial filter modules 124(F) for subsequent processing by the system 100. To mitigate this, a quality assessment module 146 described below may be used to assess the input image data 112. In other implementations the initial filter modules 124(F) may be omitted, and input quality data 148 may be determined using the quality assessment module 146.

As described above, the system 100 may comprise a plurality of embedding network modules 130(N) that accept input image data 112, or other data based on the input image data 112, and determine respective embedding vectors 136.

One or more of the embedding network modules 130(N) are associated with respective ones of translator modules 140(N). Each of the translator modules 140 may comprise a neural network or other machine learning system that, during training, determines translator weight data 142(N). The translator weight data 142(N) may comprise weight values, bias values, or other values associated with operation of nodes within the machine learning system of the embedding network model. Each translator module 140 is trained to accept the embedding vector 136 generated by a particular embedding network module 130 and produce as output a translated embedding vector 144. The translator modules 140 are trained such that the translated embedding vectors 144 are within a common embedding space. The translator module 140 is discussed in more detail with regard to FIG. 2.

The quality assessment module 146 accepts as input a plurality of translated embedding vectors 144(N) that are associated with input image data 112. The quality assessment module 146 determines input quality data 148 that is associated with the input image data 112. In one implementation, a mean distance of the translated embedding vectors 144(N) may be calculated. If the mean distance is less than a threshold distance, the input quality data 148 may indicate that the input image data 112 has sufficient quality for further processing. If the mean distance is greater than the threshold distance, the input quality data 148 may indicate that the input image data 112 has insufficient quality. Other actions, such as discarding the input data, acquiring additional input data, and so forth may be taken. The quality assessment module 146 is discussed in more detail with regard to FIGS. 3 and 4.

The system 100 may then perform one or more operations based at least in part on the input quality data 148. These may include performing an enrollment process, a query process, and so forth.

Users are able to utilize the system 100 by performing an enrollment process. An enrollment module 150 may coordinate the enrollment process. Enrollment may associate biometric information, such as embedding vectors 136 with particular information such as a name, account number, and so forth.

During an enrollment process, the user opts in and presents their hand 102 to the scanner 104. The scanner 104 provides input image data 112 to a computing device 118. The computing device 118 may include one or more of the trained embedding network modules 130. The scanner 104 may encrypt and send the input image data 112 or data based thereon to another computing device 118 such as a server. For example, the input image data 112 may be processed to determine a representation of the input image data 112, such as an encoder of a variational autoencoder backbone to determine secondary data that is representative of the input image data 112.

Once the embedding vector(s) 136 have been generated during the enrollment process, the input image data 112 may be deleted. As mentioned above, users who opt in to provide training data 120 may have their input image data 112 retained. The input image data 112 for users who do not opt in, or have rescinded their opt in, is deleted.

The quality assessment module 146 may be used to determine the input quality data 148 associated with the input image data 112. For example, a plurality of embedding vectors 136(N) may be determined based on the input image data 112 that has been passed by the initial filter modules 124(F). This plurality of embedding vectors 136(N) may be processed by the translator modules 140(T) to determine a plurality of translated embedding vectors 144(N). The quality assessment module 146 may then determine the input quality data 148 based on the translated embedding vectors 144(N). If the input quality data 148 indicates sufficient quality, the enrollment process may proceed. If not, the system 100 may provide an error message, request new input image data 112, or take other action.

During the enrollment process, the submitted embedding vector 136 may be checked to determine whether the user has been previously enrolled. A successful enrollment may comprise storage of enrolled user data 152 comprising identification data 154, such as name, telephone number, or account number, enrolled embedding vector(s) 156, and so forth. In some implementations, the enrolled user data 152 may comprise additional information associated with processing of the input image data 112 with an embedding network module 130. For example, the enrolled user data 152 may comprise intermediate layer data, such as the values of a penultimate layer of the embedding network module 130.

During subsequent usage, such as at a second time, the (as yet unidentified) user presents their hand 102 at a scanner 104. The resulting query input image data 112 may be processed as described to determine input quality data 148 of the query input image data 112. If the query input quality data 148 is of sufficient quality, a query embedding vector 162 may be provided to a comparison module 160. If not, the system 100 may provide an error message, request new input image data 112, or take other action.

The comparison module 160 compares the query embedding vector 162 to the enrolled embedding vector(s) 156 stored in the enrolled user data 152 to determine asserted identification data 164. In one implementation, the asserted identification data 164 may comprise a user identifier associated with the closest previously stored embedding vector 136 in the enrolled user data 152 to the query embedding vector 162 associated with the user who presented their hand 102. The comparison module 160 may utilize other considerations, such as requiring that the query embedding vector 162 is no more than a maximum distance in the embedding space from the enrolled embedding vector 156 of a particular user before determining the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 154 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The systems and techniques described above are discussed with respect to image data of human hands. These systems and techniques may be used with respect to other forms of data, other kinds of objects, and so forth. For example, these techniques may be used for facial recognition systems using image data of a face, audio data, object recognition systems, and so forth.

Figure 2:
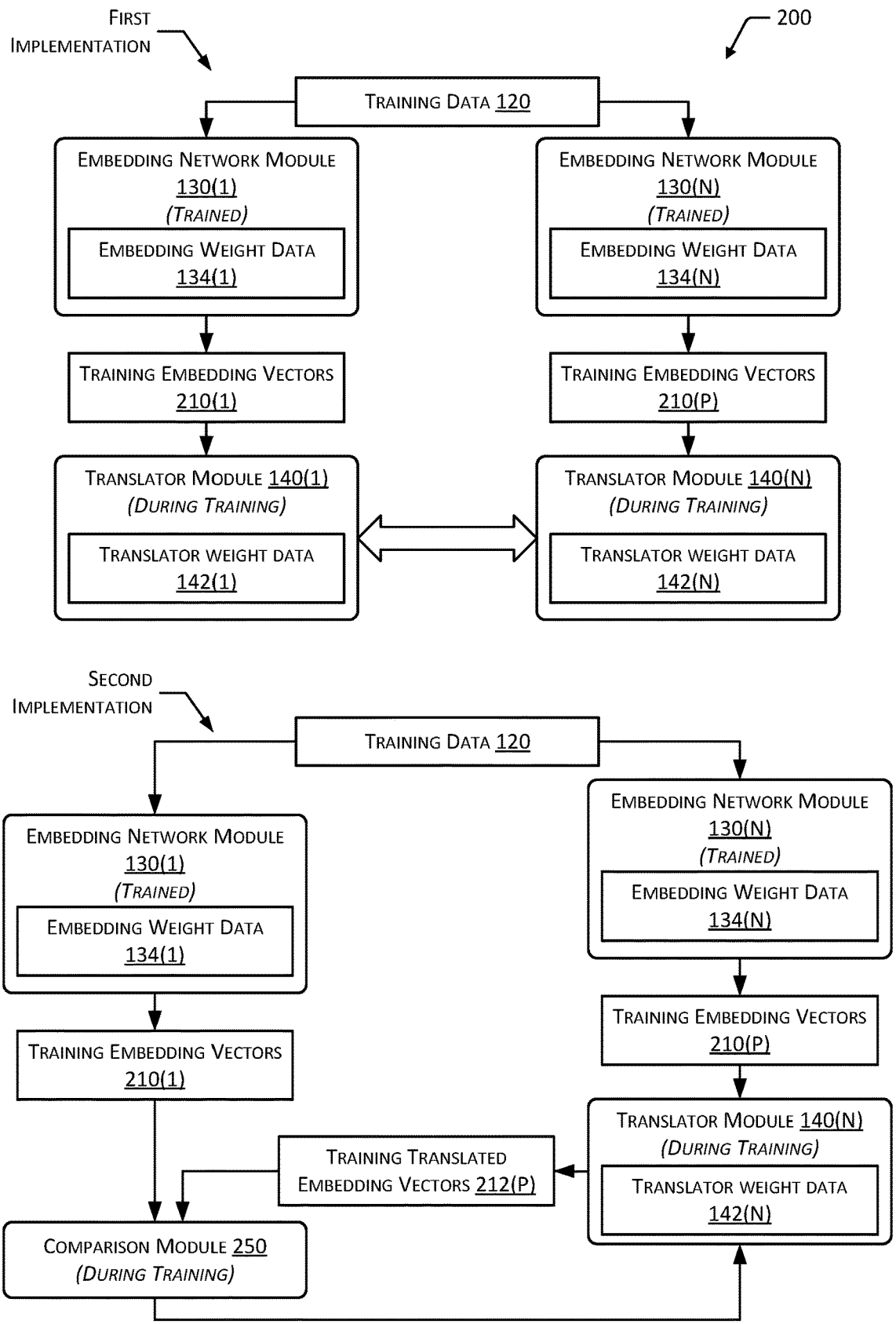
FIG. 2 illustrates a block diagram of processes to train translator modules to translate embedding vectors to a common embedding space, according to some implementations.

FIG. 2 illustrates a block diagram 200 of a first implementation and a second implementation of a process to train translator modules 140 to translate embedding vectors 136 to a common embedding space. The process may be executed at least in part by one or more computing devices 118.

The translator module 140 may comprise a neural network trained to translate an input to an output. A plurality of embedding network modules 130(1)-(N) have been previously trained to determine embedding vectors 136. As a result of previous training, the embedding weight data 134 for respective embedding network modules 130 has been determined.

During training of the translator modules 140 the training data 120 is processed by the respective embedding network modules 130(1)-(N) to determine training embedding vectors 210(1)-(P). For example, the training data 120 may comprise the input image data 112 that has been designated for training use.

In the first implementation shown, during training of the translator modules 140, a plurality of training embedding vectors 210(P) are provided to their respective translator module 140 for training to determine translator weight data 142. In one implementation the translator module 140 may implement one or more residual bottleneck transformation (RBT) modules with a compatibility constraining training scheme. During training, the translator module 140 may utilize one or more loss terms, such as similarity loss, Kullback-Leibler (KL) divergence loss, dual classification-loss, or a combination thereof. For example, if all three loss functions are used during training, the similarity loss and the KL divergence loss enforce similarity between the training embedding vectors 210 while the dual classification-loss enforces the embedding spaces to be discriminative by identity. The translator module 140 may utilize a shared classification head that constrains the embedding spaces at the output of the respective translator modules 140 to be aligned with one another in the common embedding space.

In the first implementation shown, each embedding network module 130 is associated with a respective translator module 140. The translator modules 140(1)-(N) may be trained at the same time, with information being exchanged between the respective translator modules 140. This results in the translator modules 140 providing a unified representation in a common embedding space.

In the second implementation shown, a trained embedding network module 130(1) is selected for use as a reference embedding. Translator modules 140(N) are then trained to accept as input training embedding vectors 210(P) and provide as output training translated embedding vectors 212(P) that are in the first embedding space associated with the reference embedding network module 130(1). For example, a comparison module 250 accepts as input training embedding vectors 210(1) determined by the reference embedding network module 130(1) and training translated embedding vectors 212(P) determined by the translator modules 140(N). The comparison module 250 may determine one or more loss values based on these input that are then provided back to respective translator modules 140 that determined a particular training translated embedding vector 212. The various translator modules 140 in this second implementation may be trained at different times.

In other implementations the translator module 140 may implement different architectures or other techniques. In one implementation the translator module 140 may determine a rotation matrix that is used to process input and determine output.

Once trained, the translator module 140 may accept as input the embedding vector 136(1) and provide as output a translated embedding vector 144(1).

Figure 3:
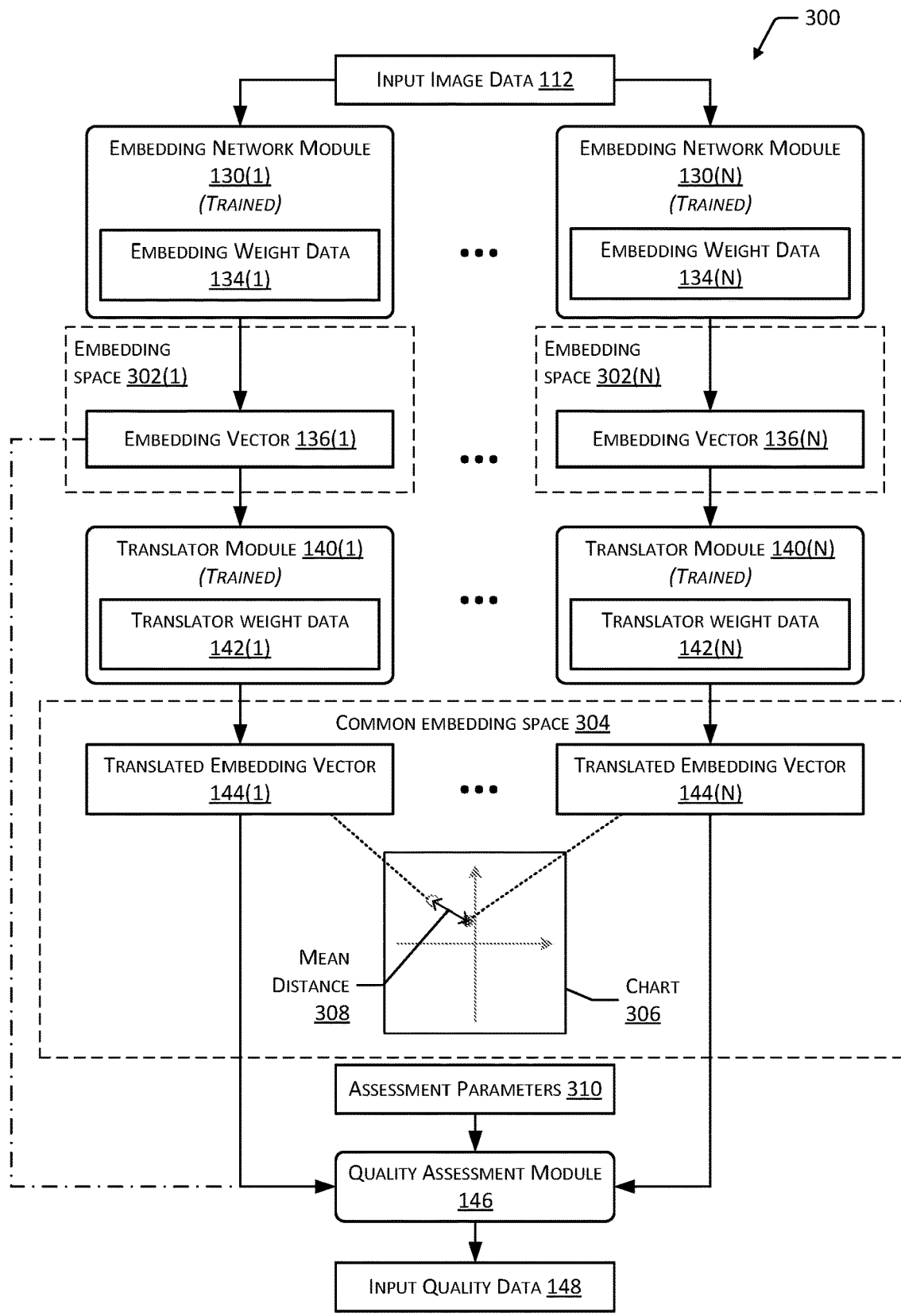
FIG. 3 illustrates a block diagram of using translated embedding vectors to determine input quality data, according to some implementations.

FIG. 3 illustrates a block diagram 300 of using translated embedding vectors 144 to determine input quality data 148, according to some implementations. The process may be executed at least in part by one or more computing devices 118.

Input quality data 148 may be determined for input data such as input image data 112. The input image data 112 is provided to a plurality of embedding network modules 130(1)-(N) that have been previously trained to determine respective embedding weight data 134. Each of the embedding network modules 130 provides as output a respective embedding vector 136. Each of these embedding vectors 136 is in a respective embedding space 302.

In a first implementation, one or more of the embedding vectors 136 are then processed by a respective translator module 140 that is associated with the embedding network module 130 that generated the respective embedding vector 136. Each of the translator modules 140 have been previously trained to determine respective translator weight data 142. The translator modules 140 each accept as input an embedding vector 136 and provide as output a translated embedding vector 144. As a result, if there are 10 embedding network modules 130(1)-(10) in use that provide 10 embedding vectors 136(1)-(10), then 10 translated embedding vectors 144(1)-(10) will be determined.

The translated embedding vectors 144(N), based on the same input image data 112, are now within a common embedding space 304. This is visualized by chart 306.

For ease of illustration and not as a limitation, chart 306 depicts a common embedding space 304 with two dimensions. During actual operation, the translated embedding vectors 144 may exist within an n-dimensional common embedding space 304. For example, the common embedding space 304 may exceed 500 dimensions.

Chart 306 depicts two points in the common embedding space 304 that are specified by respective translated embedding vectors 144, and a mean distance 308 within the common embedding space 304 between the two. In one implementation the mean distance 308 may comprise an average of a sum of pairwise distances between all pairs of points. In another implementation, the mean distance 308 may comprise an average of a sum of distances between a particular point and all other points. In yet another example, the mean distance 308 may comprise an average distance between a centroid of a volume that is bounded by the points being considered and the perimeter of the volume.

The quality assessment module 146 may accept as input the set of translated embedding vectors 144(1)-(N). The quality assessment module 146 may also utilize one or more assessment parameters 310.

In one implementation, the quality assessment module 146 may determine a mean distance of the set of translated embedding vectors 144(1)-(N). The assessment parameters 310 may specify a threshold distance. If the mean distance of the set of translated embedding vectors 144(1)-(N) is less than or equal to the threshold distance, the translated embedding vectors 144(1)-(N), the embedding vectors 136(1)-(N), and the input image data 112 they are derived from may be deemed to be of sufficient quality for operation.

In other implementations other analytical techniques may be used to assess the translated embedding vectors 144(1)-(N). In one implementation, a cosine similarity may be calculated between the set of translated embedding vectors 144. In other implementations, other approaches may comprise determining ranges between vectors, determining a coefficient of variation of the vectors, determining an entropy value of the vectors, and so forth.

In some implementations the assessment parameters 310 may include one or more translation weight values. In some situations, the output from a particular translator module 140 may be weighted differently from others. In some implementations, these weights may be selected to result in translated embedding vectors 144 from a particular translator module 140 being disregarded. In some implementations the translation weight values may be used to shift or translate, within the common embedding space 304, the translated embedding vector 144 determined by a particular translator module 140.

In other implementations, other parameters may be included in the assessment parameters 310. The assessment parameters 310 may include an outlier rejection parameter that specifies conditions under which a particular translated embedding vector 144 may be omitted from consideration by the quality assessment module 146.

While a one-to-one correspondence between embedding network modules 130 and translator modules 140 is shown, other possibilities are understood. In one implementation, a subset of the available embedding network modules 130 and the associated translator modules 140 may be used. For example, a plurality of embedding network modules 130(D) may be used that are a subset of the embedding network modules 130(N). In another implementation, a subset of the available translator modules 140 may be used. For example, a plurality of translator modules 140(E) may be used that are a subset of the translator modules 140(N).

In a second implementation, the common embedding space 304 may be associated with a particular reference embedding network module 130. In this second implementation, the translator module 140(1) for that particular reference embedding network module 130(1) is omitted, and the embedding vector 136(1) determined by the reference embedding network module 130(1) is provided as input to the quality assessment module 146. The at least a portion of the other translated embedding vectors 144(2), . . . , 144(N) are also provided as input to the quality assessment module 146.

In other implementations other input may be provided to the embedding network modules 130(N). For example, instead of input image data 112, data based on the input image data 112 such as a representation of the input image data 112 may be used.

Figure 4:
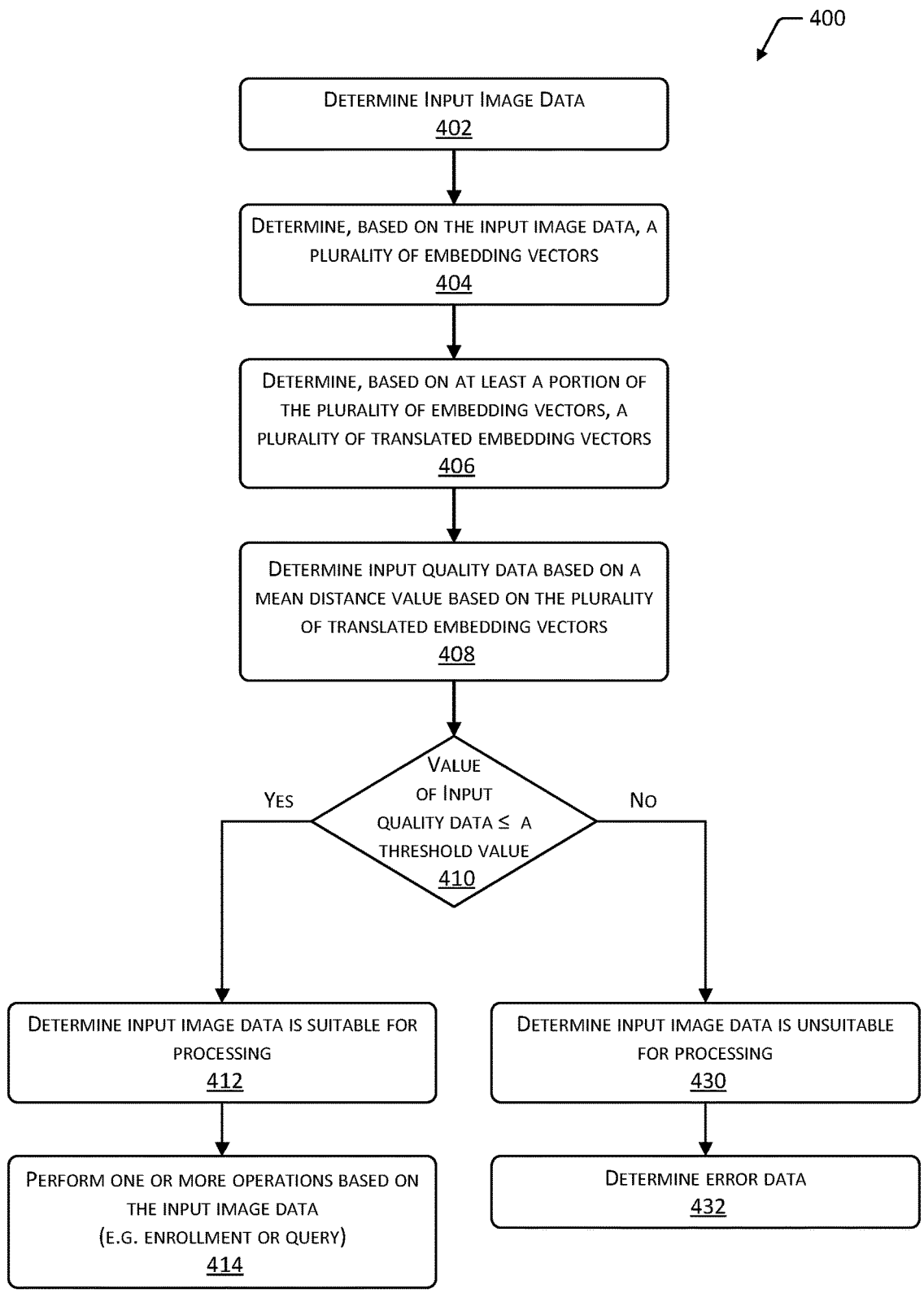
FIG. 4 illustrates a flow diagram of a process to determine if biometric input data is suitable for further operations, according to some implementations.

FIG. 4 illustrates a flow diagram 400 of a process to determine if biometric input data is suitable for further operations, according to some implementations. The process may be executed at least in part by one or more computing devices 118.

At 402 input data such as input image data 112 is determined. For example, the scanner 104 may acquire the input image data 112.

As described with respect to FIG. 1, in some implementations one or more initial filter modules 124(F) may be used to assess input image data 112 before the quality assessment module 146 receives the input image data 112. For example, the input image data 112 may be processed by one or more filters of the initial filter modules 124(F). The one or more filters may determine a filter score associated with the input image data 112 being processed. For example, a blurriness filter may determine a filter score that indicates blurriness of the image in the input image data 112. If the filter score is greater than a filter score threshold, the input image data 112 may be rejected. If the filter score is less than the filter score threshold, then the process may proceed to 404.

At 404, based on the input image data 112, a first plurality of embedding vectors 136 is determined. For example, a first plurality of embedding network modules 130(1)-(N) may be used to process the input image data 112.

At 406, based on at least a portion of the first plurality of embedding vectors 136, a plurality of translated embedding vectors 144 is determined. As described with regard to the first implementation of FIG. 3, each of the embedding vectors 136 in the first plurality of embedding vectors 136 may be translated by the respective translator modules 140 to determine the plurality of translated embedding vectors 144. In another implementation, such as described in the second implementation of FIG. 3, the embedding vector 136(1) determined by a reference embedding network module 130(1) may be included in a second plurality of vectors for further processing. The second plurality of vectors may then comprise the embedding vector 136(1) (untranslated) and the translated embedding vectors 144 determined by the translator modules 140.

At 408 input quality data 148 is determined based on the plurality of translated embedding vectors 144. In one implementation, the input quality data 148 may be based on a mean distance of the plurality of translated embedding vectors 144. As described, in other implementations other techniques may be used.

At 410 a determination is made based on the input quality data 148. It is understood that a variety of different comparisons or analytical techniques may be used. In this figure, by way of illustration and not necessarily as a limitation, a threshold determination is shown. If a value of the input quality data 148 is less than or equal to a threshold value, the process proceeds to 412. At 412 one or more of the input image data 112 or the data based thereon is determined to be suitable for processing. The process may then proceed to 414. At 414 one or more operations are performed based on the input image data 112 or the data based thereon. For example, the enrollment module 150 may determine the enrolled user data 152 based on one or more of the embedding vectors 136 associated with the input image data 112. In another example, the comparison module 160 may use a query embedding vector 162 that is associated with the input image data 112 to determine asserted identification data 164.

Returning to 410, if the value of the input quality data is greater than a threshold value, the process proceeds to 430. At 430 the input image data 112 or the data based thereon is deemed unsuitable for further processing. The process may then proceed to 432. At 432 error data may be determined. For example, the error data may be indicative of the inadequate quality of the input image data 112. In some implementations, responsive to the error data, other operations may be performed. For example, a user interface may present a prompt to the user to present their hand 102 again for acquisition of new input image data 112.

In some implementations a plurality of input data may be acquired. For example, a plurality of input image data 112 may be acquired during presentation of the hand 102. The input quality data 148 for the plurality of input data may be determined. Based on this input quality data 148, one or more particular instances of input image data 112 or the data based thereon may be determined for later use. For example, the quality assessment module 146 may determine a top k "best" instances of input image data 112 and use those for subsequent processing, where k is a natural number. The top k "best" instances may be determined by sorting the available input image data 112 by one or more values of their respective input quality data 148. For example, a plurality of input image data 112 may be sorted in ascending order by mean distance. The first k entries in this list that are less than the threshold value may be deemed suitable for further processing.

In another implementation, a top single entry of input image data 112 or the data based thereon may be selected for use. For example, the system 100 may be operated to determine a set of at least p instances of input image data 112 that are deemed by the quality assessment module 146 to have sufficient quality for further use, where p is a natural number. Out of this set of p instances, the instance having the lowest mean distance may be selected.

Figure 5:
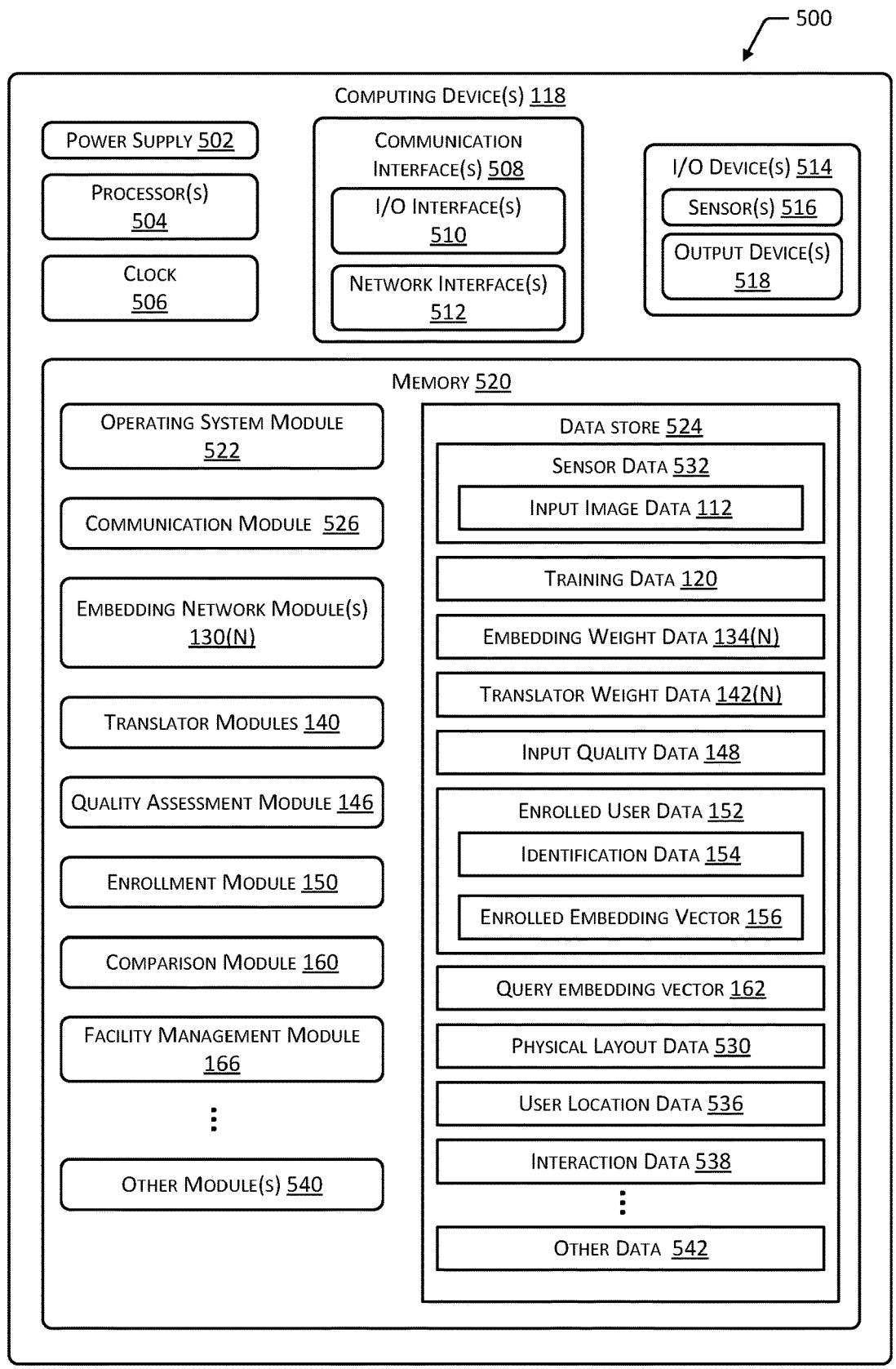
FIG. 5 is a block diagram of a computing device to implement the system, according to some implementations.

FIG. 5 is a block diagram 500 of a computing device 118 to implement the system 100 or a portion thereof, according to some implementations.

The computing device 118 may be within the scanner 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (Saas)", "platform computing", "network-accessible platform", "cloud services", "data centers", and so forth. Services provided by the computing device 118 may be distributed across one or more physical or virtual devices.

One or more power supplies 502 may be configured to provide electrical power suitable for operating the components in the computing device 118. The one or more power supplies 502 may comprise batteries, capacitors, fuel cells, photovoltaic cells, wireless power receivers, conductive couplings suitable for attachment to a power source such as provided by an electric utility, and so forth. The computing device 118 may include one or more hardware processors 504 (processors) configured to execute one or more stored instructions. The processors 504 may comprise one or more cores. One or more clocks 506 may provide information indicative of date, time, ticks, and so forth. For example, the processor 504 may use data from the clock 506 to associate a particular interaction with a particular point in time.

The computing device 118 may include one or more communication interfaces 508 such as input/output (I/O) interfaces 510, network interfaces 512, and so forth. The communication interfaces 508 enable the computing device 118, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 516, keyboard, mouse, scanner, and so forth. The I/O devices 514 may also include output devices 518 such as one or more of a display device, printer, audio speakers, and so forth. In some embodiments, the I/O devices 514 may be physically incorporated with the computing device 118 or may be externally placed. The sensors 516 may comprise the camera 108, smartcard readers, touch sensors, microphones, and so forth.

The network interfaces 512 may be configured to provide communications between the computing device 118 and other devices, such as routers, access points, and so forth. The network interfaces 512 may include devices configured to couple to personal area networks (PANs), local area networks (LANs), wireless local area networks (WLANS), wide area networks (WANs), and so forth. For example, the network interfaces 512 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 5, the computing device 118 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the computing device 118. A few example functional modules are shown stored in the memory 520, although the same functionality may alternatively be implemented in hardware, firmware, or as a system on a chip (SoC).

The memory 520 may include at least one operating system (OS) module 522. The OS module 522 is configured to manage hardware resource devices such as the I/O interfaces 510, the I/O devices 514, the communication interfaces 508, and provide various services to applications or modules executing on the processors 504. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 526 may be configured to establish communications with the computing device 118, servers, other computing devices 118, or other devices. The communications may be authenticated, encrypted, and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other computing devices 118, network attached storage devices, and so forth.

The data store 524 may store one or more of the training data 120, embedding weight data 134, enrolled user data 152, query embedding vector 162, and so forth. The memory 520 may store the embedding network module 130, the enrollment module(s) 150, the comparison module 160, the facility management module 166, and so forth.

In some implementations, the input image data 112 may be temporarily stored during processing by the embedding network module 130. For example, the scanner 104 may acquire the input image data 112, determine the embedding vector 136 based on the input image data 112, and then erase the input image data 112. The resulting embedding vector 136 may then be sent to a server or other computing device 118 to perform enrollment, for comparison to assert an identity, and so forth.

The embedding network module 130 may determine the embedding vectors 136(N) based on input image data 112.

The translator modules 140(N) accept as input the embedding vectors 136 and determine the translated embedding vectors 144.

The quality assessment module 146 accepts as input the translated embedding vectors 144 and determines input quality data 148.

The enrollment module 150 may be used to determine the enrolled user data 152.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 532 such as input image data 112, or data from other sensors.

Information used by the facility management module 166 may be stored in the data store 524. For example, the data store 524 may be used to store physical layout data 530, sensor data 532, asserted identification data 164 (not shown), user location data 536, interaction data 538, and so forth. For example, the sensor data 532 may comprise the input image data 112 obtained from a scanner 104 associated with the facility.

The physical layout data 530 may provide information indicative of where scanners 104, cameras, weight sensors, antennas for radio receivers, inventory locations, and so forth are in the facility with respect to one another. For example, the physical layout data 530 may comprise information representative of a map or floor plan of the facility with relative positions of gates with scanners 104 and inventory locations.

The facility management module 166 may generate the user location data 536 that is indicative of the location of the user within the facility. For example, the facility management module 166 may use image data obtained by the cameras to determine a location of the user. In other implementations, other techniques may be used for determining the user location data 536. For example, data from a smart floor may be used to determine the location of the user.

The identification data 154 may be associated with user location data 536. For example, the user enters the facility and has their hand 102 scanned by the scanner 104, resulting in asserted identification data 164 that is associated with their time of entry and the scanner 104 location. The user location data 536 indicative of a path of a user that begins at the scanner 104 location at the time of entry may be associated with the user identifier in the asserted identification data 164.

Based on the user location data 536 and the interaction data 538, a particular interaction may be associated with an account of a particular user. For example, if the user location data 536 indicates that the user is present in front of inventory location 592 at time 09:02:02 and the interaction data 538 indicates a pick of a quantity of one item from an area on inventory location 592 at 09:04:13, the user may be billed for that pick.

The facility management module 166 may use the sensor data 532 to generate the interaction data 538. The interaction data 538 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 538 that indicates what item the user picked from a particular lane on a shelf, and then use this interaction data 538 to adjust the count of inventory stowed at that lane. The interaction data 538 may then be used to bill an account associated with the user identifier that is associated with the user who picked the item.

The facility management module 166 may process the sensor data 532 and generate output data. For example, based on the interaction data 538, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 540 may also be present in the memory 520 as well as other data 542 in the data store 524. For example, a billing module may use the interaction data 538 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot, kiosk, or other device may incorporate a scanner 104. The device may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. In other examples, the input to the system 100 may comprise one or more of audio data, point cloud data, and so forth. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a non-transitory memory, storing first computer-executable instructions; and
 a hardware processor to execute the first computer-executable instructions to:
  determine input image data of a hand, wherein the input image data comprises surface and subcutaneous features of the hand;
  determine a first embedding vector using the input image data as input to a first trained embedding network module, wherein the first embedding vector is associated with a first embedding space;
  determine a first translated embedding vector using the first embedding vector as input to a first trained translator module, wherein the first translated embedding vector is associated with a common embedding space;
  determine a second embedding vector using the input image data as input to a second trained embedding network module, wherein the second embedding vector is associated with a second embedding space;
  determine a second translated embedding vector using the second embedding vector as input to a second trained translator module, wherein the second translated embedding vector is associated with the common embedding space;
  determine a distance between the first translated embedding vector and the second translated embedding vector in the common embedding space;
  determine the distance is less than a threshold value; and
  determine input quality data that indicates the input image data is suitable for further processing.

2. The system of claim 1, the hardware processor to further execute the first computer-executable instructions to:
 determine identification data associated with a first user, wherein the input image data is representative of the first user;
 determine one or more enrolled embedding vectors based on one or more of the first embedding vector or the second embedding vector; and
 associate the identification data with the one or more enrolled embedding vectors.

3. The system of claim 1, the hardware processor to further execute the first computer-executable instructions to:
 determine identification data that is associated with the input image data based on one or more of the first embedding vector or the second embedding vector.

4. A system comprising:
 a non-transitory memory, storing first computer-executable instructions; and
 a hardware processor to execute the first computer-executable instructions to:
  determine first data;

determine a first plurality of embedding vectors using the first data as input to a plurality of embedding network modules, wherein each of the first plurality of embedding vectors is associated with a respective embedding space;

determine a second plurality of embedding vectors using at least a portion of the first plurality of embedding vectors as inputs to a plurality of translator modules, wherein each of the second plurality of embedding vectors is associated with a common embedding space;

determine first input quality data based on the second plurality of embedding vectors; and determine whether the first data is suitable for processing based on the first input quality data.

5. The system of claim 4, the hardware processor to further execute the first computer-executable instructions to:
determine second data and third data;
determine, using one or more filters, a first filter score associated with the second data;
determine, using the one or more filters, a second filter score associated with the third data;
determine the first filter score is greater than a first threshold value;
determine the second filter score is less than the first threshold value; and
determine the first data based on the second data.

6. The system of claim 4, the hardware processor to further execute the first computer-executable instructions to:
determine a mean distance between the second plurality of embedding vectors;
wherein the first input quality data is based on the mean distance.

7. The system of claim 4, the hardware processor to further execute the first computer-executable instructions to:
determine a first plurality of weights, wherein each weight of the first plurality of weights is associated with respective ones of the second plurality of embedding vectors;
wherein the determination of the first input quality data is further based on the first plurality of weights.

8. The system of claim 4, wherein the first data comprises one or more of:
image data of a hand,
image data of a face, or
audio data.

9. The system of claim 4, wherein the first input quality data is indicative of a first distance; and the hardware processor to further execute the first computer-executable instructions to:
determine second data;
determine a third plurality of embedding vectors using the second data as input to the plurality of embedding network modules;
determine a fourth plurality of embedding vectors using the third plurality of embedding vectors as inputs to the plurality of translator modules;
determine second input quality data based on the fourth plurality of embedding vectors, wherein the second input quality data is indicative of a second distance;
determine the first distance is less than the second distance; and
perform one or more operations using one or more of the first data, the first plurality of embedding vectors, or the second plurality of embedding vectors.

10. The system of claim 4, the hardware processor to further execute the first computer-executable instructions to:
determine, based on the first input quality data, an error message associated with the first data; and
send the error message.

11. The system of claim 4, the hardware processor to further execute the first computer-executable instructions to:
determine that the first data is suitable for processing;
determine identification data associated with a first user, wherein the first data is representative of the first user;
determine one or more enrolled embedding vectors based on one or more of the first plurality of embedding vectors or the second plurality of embedding vectors; and
associate the identification data with the one or more enrolled embedding vectors.

12. The system of claim 4, the hardware processor to further execute the first computer-executable instructions to:
determine identification data that is associated with the first data based on one or more of the first plurality of embedding vectors or the second plurality of embedding vectors.

13. A method comprising:
determining first data comprising biometric information;
determining a first plurality of embedding vectors using the first data as input to a plurality of embedding network modules, wherein each of the first plurality of embedding vectors is associated with a respective embedding space;
determining at least a portion of a second plurality of embedding vectors using at least a portion of the first plurality of embedding vectors as inputs to a plurality of translator modules, wherein each of the at least a portion of the second plurality of embedding vectors is associated with a common embedding space;
determining a mean distance based on the at least a portion of the second plurality of embedding vectors; and
determining first input quality data based on the mean distance.

14. The method of claim 13, further comprising:
determining second data and third data;
determining, using one or more filters, a first filter score associated with the second data;
determining, using the one or more filters, a second filter score associated with the third data;
determining the first filter score is greater than a first threshold value;
determining the second filter score is less than the first threshold value; and
determining the first data based on the second data.

15. The method of claim 13, further comprising:
determining a first plurality of weights, wherein each weight of the first plurality of weights is associated with respective ones of the at least a portion of the second plurality of embedding vectors; and
determining the first input quality data based on the first plurality of weights and the at least a portion of the second plurality of embedding vectors.

16. The method of claim 13, the first data comprising one or more of:
image data of a hand,
image data of a face, or
audio data.

17. The method of claim 13, further comprising:
determining second data;
determining a third plurality of embedding vectors using the second data as input to the plurality of embedding network modules;

determining a fourth plurality of embedding vectors using the third plurality of embedding vectors as inputs to the plurality of translator modules;

determining second input quality data based on the fourth plurality of embedding vectors, wherein the second input quality data is indicative of a second distance;

determining the mean distance is less than the second distance; and performing one or more operations using one or more of the first data, the first plurality of embedding vectors, or the at least a portion of the second plurality of embedding vectors.

18. The method of claim 13, further comprising:

determining identification data associated with a first user, wherein the first data is representative of the first user;

determining one or more enrolled embedding vectors based on one or more of the first plurality of embedding vectors or the at least a portion of the second plurality of embedding vectors; and associating the identification data with the one or more enrolled embedding vectors.

19. The method of claim 13, further comprising:

determining identification data that is associated with the first data based on one or more of the first plurality of embedding vectors or the at least a portion of the second plurality of embedding vectors.

20. The method of claim 13, further comprising:

comparing the first input quality data with a threshold value; and determining that:
  the first data is suitable for processing if the first input quality data is less than or equal to the threshold value, or
  the first data is not suitable for processing if the first input quality data is greater than the threshold value.

* * * * *